(12) United States Patent
Kodama et al.

(10) Patent No.: US 8,202,647 B2
(45) Date of Patent: Jun. 19, 2012

(54) LAMINATE CASED BATTERY

(75) Inventors: Yasunobu Kodama, Moriguchi (JP); Kazuhiro Okuda, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 1037 days.

(21) Appl. No.: 11/687,988

(22) Filed: Mar. 19, 2007

(65) Prior Publication Data

US 2007/0224499 A1 Sep. 27, 2007

(30) Foreign Application Priority Data

Mar. 20, 2006 (JP) .................................. 2006-076644

(51) Int. Cl.
*H01M 2/08* (2006.01)
(52) U.S. Cl. ......... 429/185; 429/162; 429/163; 429/176
(58) Field of Classification Search .................... 429/177
See application file for complete search history.

(56) References Cited

U.S. PATENT DOCUMENTS

2005/0191549 A1* 9/2005 Kang et al. .................... 429/185

FOREIGN PATENT DOCUMENTS

| JP | 2000-208110 A | 7/2000 |
| JP | 2003-303577 A | 10/2003 |

* cited by examiner

*Primary Examiner* — Ula C Ruddock
*Assistant Examiner* — Patricia Davis
(74) *Attorney, Agent, or Firm* — Westerman, Hattori, Daniels & Adrian, LLP

(57) ABSTRACT

A laminate cased battery in which at least one of curvature radiuses $R_B$ and $R_D$ of the corners (bottom side corners) where the first side surface respectively meets the second main surface, the third side surface and the fourth side surface is set to be larger than at least one of curvature radiuses $R_A$ and $R_C$ of the corners (top side corners) where the second side surface respectively meets the second main surface, the third side surface and the fourth side surface.

9 Claims, 5 Drawing Sheets

LAMINATE CASED BATTERY

BACKGROUND OF THE INVENTION (1) Field of the Invention

The present invention relates to a laminate cased battery including an outer casing made from a sheet of metal laminate, and more specifically, to the shape of the outer casing.

(2) Description of the Related Art

In recent years, portable machines such as mobile phones have become prevalent. In such portable machines, batteries are widely used as the power sources. Among those batteries, lithium polymer batteries with laminate outer casings (hereinafter referred to as "laminate cased batteries"), which have an advantage of being lightweight and having high energy density, are adopted in many types of portable machines.

The laminate cased batteries are formed by housing an electrode assembly, which includes a positive electrode plate, a negative electrode plate and a separator, into a dent that has been formed by executing a punch working on a sheet of metal laminate, bending the sheet so that a half of the sheet without the dent overlaps with the other half with the dent to close the opening of the dent, and sealing the folded sheet at the periphery of the dent. It should be noted here that many laminate cased batteries adopt what is called three-side-sealed structure in which the dent is rectangular, and the outer casing is formed by forming the dent in a sheet of laminate, bending the metal laminate sheet using one side of the dent as the return line, and sealing the folded sheet at three side edges surrounding the opening of the dent. Laminate cased batteries with such a structure are disclosed in, for example, Japanese Patent Application Publications No. 2000-208110 and No. 2003-303577.

However, in the laminate cased batteries with such a structure, when the dent is formed in the laminate sheet, pin holes or cracks often occur at corners of the dent in the laminate outer casing. It is thought that the pin holes or cracks will become a major problem especially when, in response to the increasing demands, the provision of a laminate cased battery with increased capacity or reduced weight is tried. Especially, when the capacity is increased, the size, including the thickness, of the electrode assembly will be increased, as well. In such a case, a deeper dent needs to be formed in the laminate cased battery. And the pin holes or cracks are more apt to occur when the deeper dent is formed.

SUMMARY OF THE INVENTION

The object of the present invention is therefore to provide a laminate cased battery with high energy density and reduced occurrences of pin holes and cracks in the laminate outer casing.

The inventors of the present invention investigated into the cause of the pin holes and cracks occurring at the corners of the laminate outer casing, and found that the pin holes and cracks are especially apt to occur at, among the corners of the rectangular dent, corners on its bottom side that includes the "return line" at which the metal laminate sheet is bent when the outer casing is formed. The inventors further found that the positional difference in the occurrence of the pin holes and the like derives from the stresses applied when the dent is formed in the metal laminate sheet.

The above-stated object is therefore fulfilled by a laminate cased battery of the present invention that includes the following characteristics.

That is to say, the laminate cased battery of the present invention includes an electrode assembly including a positive plate and a negative plate, and an outer casing made from a sheet of metal laminate in a shape of a box having a substantially rectangular parallelepiped inner space surrounded by a first main surface, a second main surface, a first side surface, a second side surface, a third side surface, and a fourth side surface which are each substantially rectangular, the first and second main surfaces facing each other, the electrode assembly being housed in the inner space, the first and second side surfaces facing each other with the electrode assembly therebetween, the third and fourth side surfaces facing each other with the electrode assembly therebetween, where a part of the sheet corresponding to the first main surface is contiguous to a part of the sheet corresponding to the first side surface and is bonded with parts of the sheet respectively corresponding to the second through fourth side surfaces.

In the laminate cased battery of the present invention, each corner where any of the second main surface, the first side surface, the second side surface, the third side surface and the fourth side surface meet each other is rounded, and at least one of corners where the first side surface respectively meets the second main surface, the third side surface and the fourth side surface is larger in curvature radius than at least one of corners where the second side surface respectively meets the second main surface, the third side surface and the fourth side surface.

As described above, in the laminate cased battery of the present invention, when the metal laminate sheet is processed, the corners where the first side surface respectively meets the second main surface, the third side surface and the fourth side surface (bottom side corners where surfaces meet) are set to be larger in the curvature radius than the corners where the second side surface respectively meets the second main surface, the third side surface and the fourth side surface (top side corners where surfaces meet). With this structure, it is possible to reduce the stresses applied to the bottom side corners where surfaces meet, when the dent is formed in the metal laminate sheet. Accordingly, with this structure, the laminate cased battery of the present invention can restrict the occurrence of pin holes and cracks.

It should be noted here that the occurrence of the pin holes and cracks in the processing of the metal laminate sheet will be prevented also if all the corners where surfaces meet are set to be larger in the curvature radius than the corners in the conventional technologies. However, if all the corners where surfaces meet are set to be larger, an amount of wasteful space in the laminate cased battery will increase, which is disadvantageous in terms of energy efficiency. Also, if all the corners including top side corners are set to be larger in the curvature radius, a problem that the electrode assembly shifts in position during manufacturing or use of the battery may arise, or even a problem that the electrode plate of the electrode assembly is broken may arise.

In regards with the above-mentioned problems, the laminate cased battery of the present invention has a structure in which only the bottom side corners where surfaces meet are set to be larger in the curvature radius than the corners in the conventional technologies, and the bottom side corners are set to be larger in the curvature radius than the top side corners. With this structure, the reduction of the energy efficiency can be restricted to the minimum, and when the battery is manufactured (especially, when, after the electrode assembly, is housed in the dent, the sheet is sealed at three side edges thereof), problems, such as breaking the electrode plate of the electrode assembly, can be restricted.

Accordingly, the laminate cased battery of the present invention achieves high energy density and reduced occurrences of pin holes and cracks in the laminate outer casing.

The laminate cased battery of the present invention can have the following variations.

In the above-described laminate cased battery, corners where the first side surface respectively meets the third side surface and the fourth side surface may be larger in curvature radius than corners where the second side surface respectively meets the third side surface and the fourth side surface.

In the above-described laminate cased battery, a corner where the first side surface meets the second main surface may be larger in curvature radius than a corner where the second side surface meets the second main surface.

In the above-described laminate cased battery, corners where the second side surface respectively meets the third side surface and the fourth side surface may be larger in curvature radius than a corner where the second side surface meets the second main surface.

In the above-described laminate cased battery, at least one of corners where the first side surface respectively meets the second main surface, the third side surface and the fourth side surface may be larger in curvature radius by 0.3 mm or more than at least one of corners where the second side surface respectively meets the second main surface, the third side surface and the fourth side surface.

In the above-described laminate cased battery, at least one of corners where the first side surface respectively meets the second main surface, the third side surface and the fourth side surface may be larger in curvature radius by 1.0 mm or more than at least one of corners where the second side surface respectively meets the second main surface, the third side surface and the fourth side surface.

In the above-described laminate cased battery, what is called three-side-sealed structure may be adopted.

In the above-described laminate cased battery, leads that are respectively connected to the positive plate and the negative plate may extend out from one side of the electrode assembly, and the leads pass through an area where the second side surface and the first main surface meet each other to extend out of the outer casing.

It should be noted here that the laminate cased battery of the present invention is characterized by how each of the corners at which the surfaces of the laminate outer casing meet each other is rounded, and that, if the corners have been tapered step by step toward their tips to have a shape that is substantially equal to the shape of rounded corners, such corners are included in the technical scope of the present invention.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes a preferred embodiment of the present invention, with reference to the attached drawings. It should be noted here that the following embodiment is provided as one example to explain the structure, and the acts and effects produced by the structure. Accordingly, the present invention is not limited to the following disclosure, except for the structure of the characteristics of the present invention.

1. Structure of Laminate Cased Battery

The structure of a laminate cased battery (hereinafter merely referred to as "battery") 1 of the present embodiment will be described with reference to FIGS. 1, 2A, and 2B.

Figure 1:
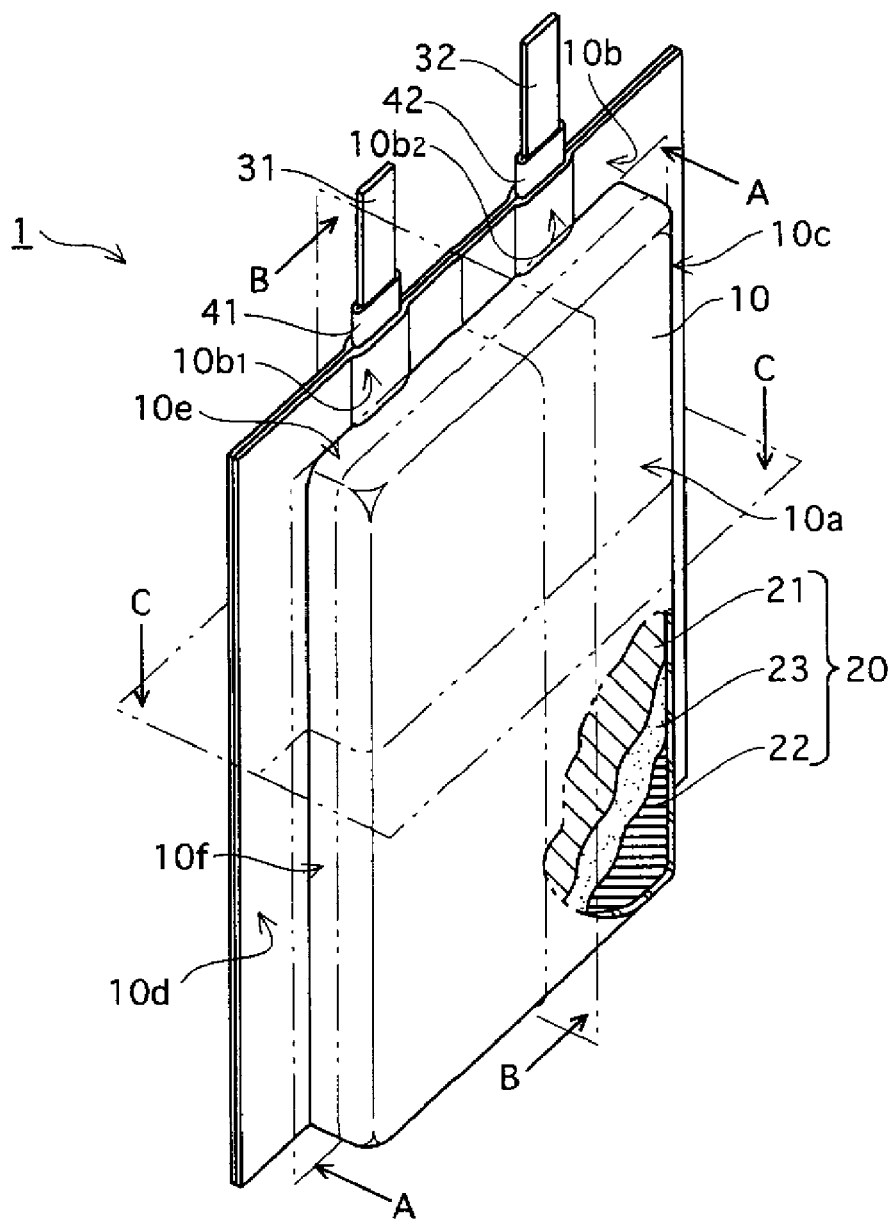
FIG. 1 is a perspective view schematically showing an appearance of the laminate cased battery 1 in an embodiment of the present invention.
Figure 1:
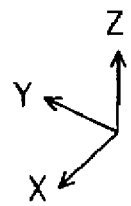

As shown in FIG. 1, the battery 1 has a structure in which an electrode assembly 20 is housed in an inner space of an outer casing 10, which is made from one sheet of metal laminate and has been sealed at three side edges 10b, 10c, and 10d thereof. The electrode assembly 20 is formed by arranging a positive electrode plate 21 and a negative electrode plate 22 to face each other with a separator 23 therebetween, and winding the set of these members. Tabs 31 and 32 are connected to the positive electrode plate 21 and the negative electrode plate 22, respectively. The tabs 31 and 32 are extended out upward from the outer casing 10 to cross the side edge 10b that is on the upper side of the outer casing 10 in the Z axis direction shown in FIG. 1.

The tab 31 is made of, for example, aluminum (Al). The tab 32 is made of, for example, nickel (Ni). The tabs 31 and 32 are wound with tab resins 41 and 42 respectively, at positions where they intersect with the side edge 10b. This makes it possible to insulate the tabs 31 and 32 from each other, and insulate the tabs 31 and 32 from the outer casing 10. Further, the side edge 10b is provided with tab allowance portions 10b1 and 10b2 that are portions of the side edge 10b swelling outward in the Y axis direction to let the tabs 31 and 32 pass through therein.

The metal laminate sheet constituting the outer casing 10 is formed, for example, by covering both main surfaces of a metal layer, which is made of aluminum (Al), with a polypropylene (PP) layer and a nylon layer. The thickness of the layers constituting the metal laminate sheet are, for example, as follows.

nylon layer 25 [μm]
Al layer 40 [μm]
PP layer 45 [μm]

As shown in FIG. 1, the outer casing 10 includes a housing space for housing the electrode assembly 20 that is rectangular in a cross section (a cross section taken along the line on the X and Z axes). The bottom of the housing space is a main surface 10a (the main surface that is on the front side in the Y axis direction). As shown in FIG. 2A, four side surfaces 10e, 10f, 10g, and 10h are formed to meet each side of the main surface 10a. Also, as shown in FIG. 2B, the outer casing 10 has a main surface 10i that faces the main surface 10a with the electrode assembly 20 therebetween. The battery 1 of the present embodiment is what is called three-side-sealed battery, where the outer casing 10 is formed by forming a dent in a sheet of metal laminate, bending the metal laminate sheet such that the main surface 10i of the sheet overlaps with an area of the metal laminate sheet including the dent while the electrode assembly 20 is housed in the dent, and sealing the folded sheet at the side edges 10b, 10c, and 10d.

It should be noted here that in the battery 1 of the present embodiment, the side including the side surface 10g is defined as "bottom side" of the battery 1, and the side including the side surface 10e is defined as "top side" of the battery 1. That is to say, the side where the tabs 31 and 32 extend out is defined as the top side of the battery 1, and the side opposite to the top side is defined as the bottom side.

2. Shape of Outer Casing 10

The battery 1 of the present embodiment is characterized mainly in the shape of the outer casing 10. This will be described with reference to FIGS. 2A, 2B, and 3.

Figure 2A:
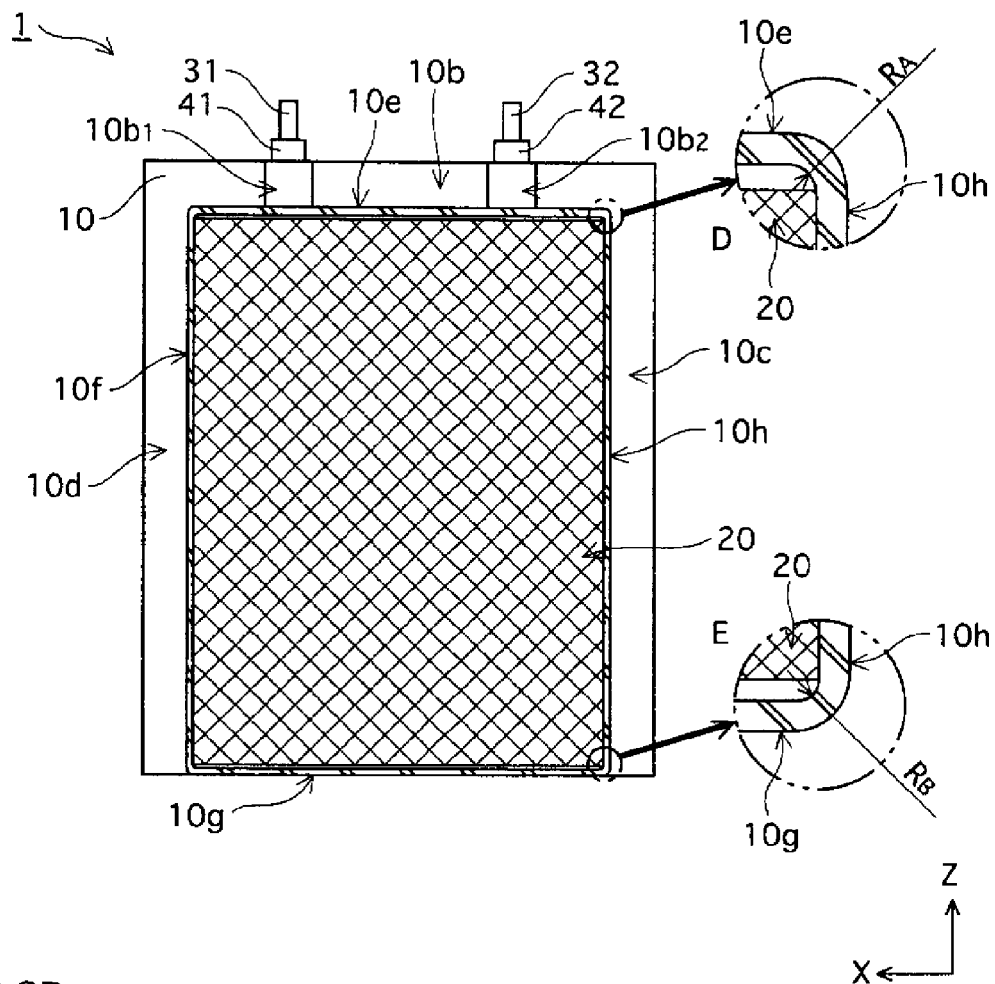
FIG. 2A is a schematic cross section of the laminate cased battery 1 taken along the A-A plane.
Figure 2B:
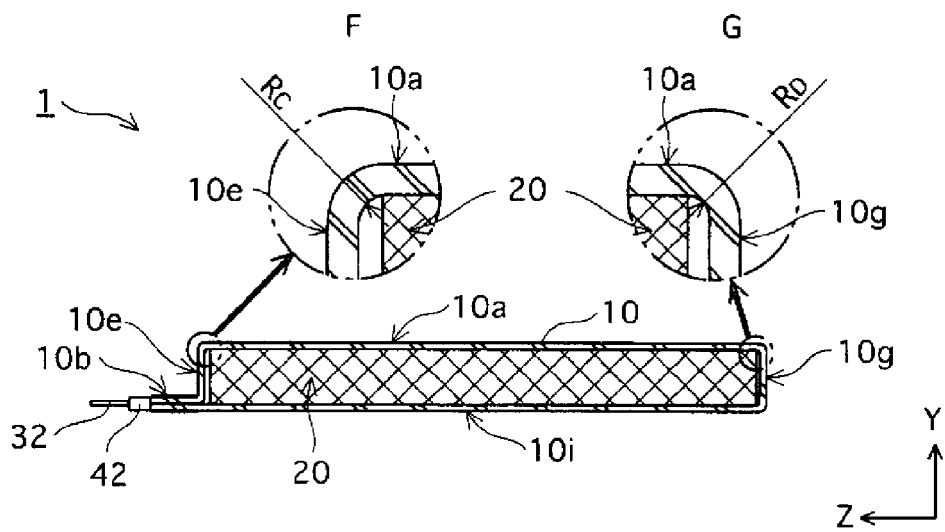
FIG. 2B is a schematic cross section of the laminate cased battery 1 taken along the B-B plane.
Figure 3:
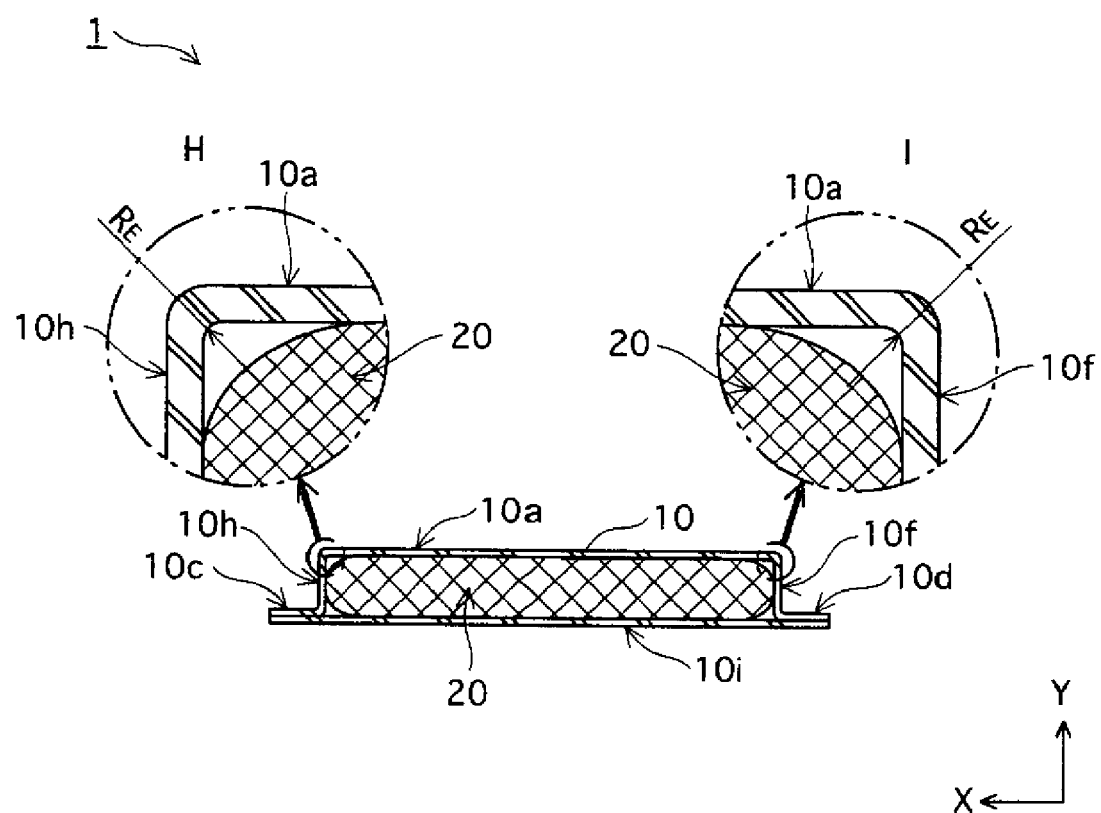
FIG. 3 is a schematic cross section of the laminate cased battery 1 taken along the C-C plane.

As shown in FIGS. 2A, 2B, and 3, in the outer casing 10 of the battery 1 of the present embodiment, each corner where the surfaces 10a to 10i meet each other is rounded. Here, the rounding of the corners is achieved by the plastic working or the like.

2-1 Corners where Side Surfaces 10e to 10h Meet

As shown in an enlargement D in an upper part of FIG. 2A, the corner where the side surface 10e and the side surface 10h on the top side meet each other is rounded such that the inner surface of the corner has a curvature radius $R_A$. Further, although its detailed illustration is omitted, the corner where the side surface 10e and the side surface 10f meet each other is rounded such that the inner surface of the corner has a curvature radius $R_A$.

On the other hand, as shown in an enlargement E in a lower part of FIG. 2A, the corner where the side surface 10g and the side surface 10h on the bottom side meet each other is rounded such that the inner surface of the corner has a curvature radius $R_B$. Similarly, the corner where the side surface 10g and the side surface 10f meet each other is rounded such that the inner surface of the corner has a curvature radius $R_B$.

The battery 1 of the present embodiment is set so that curvature radius $R_A$ and the curvature radius $R_B$ have the following relationship.

$$R_A < R_B \quad \text{[Equation 1]}$$

2-2 Corners where Main Surface 10a and Side Surface 10e, 10g Meet

As shown in an enlargement F in the left part of FIG. 2B, the corner where the side surface 10e and the main surface 10a on the top side meet each other is rounded such that the inner surface of the corner has a curvature radius $R_C$.

On the other hand, as shown in an enlargement G in the right part of FIG. 2B, the corner where the side surface 10g and the main surface 10a on the top side meet each other is rounded such that the inner surface of the corner has a curvature radius $R_D$.

The curvature radius $R_C$ and the curvature radius $R_D$ are set to have the following relationship.

$$R_C < R_D \quad \text{[Equation 2]}$$

2-3 Corners where Main Surface 10a and Side Surface 10f, 10h Meet

As shown in enlargements H and I of FIG. 3, the corner where the side surface 10f and the main surface 10a meet each other and the corner where the side surface 10h and the main surface 10a meet each other are rounded such that the inner surfaces of the corners have a curvature radius $R_E$, respectively. The curvature radius $R_E$ is set to have the following relationship.

$$R_C < R_E \quad \text{[Equation 3]}$$

3. Manufacturing Method of Battery 1

The manufacturing method of the battery 1 in the present embodiment will be described with reference to FIGS. 4, 5A, and 5B.

3-1 Forming Dent in Metal Laminate Sheet

In the battery 1 of the present embodiment, a dent is formed in one sheet of metal laminate, the electrode assembly 20 is housed in the formed dent, and the sheet is sealed at three side edges thereof. First, how to form the dent in metal laminate sheet will be described with reference to FIG. 4.

Figure 4:
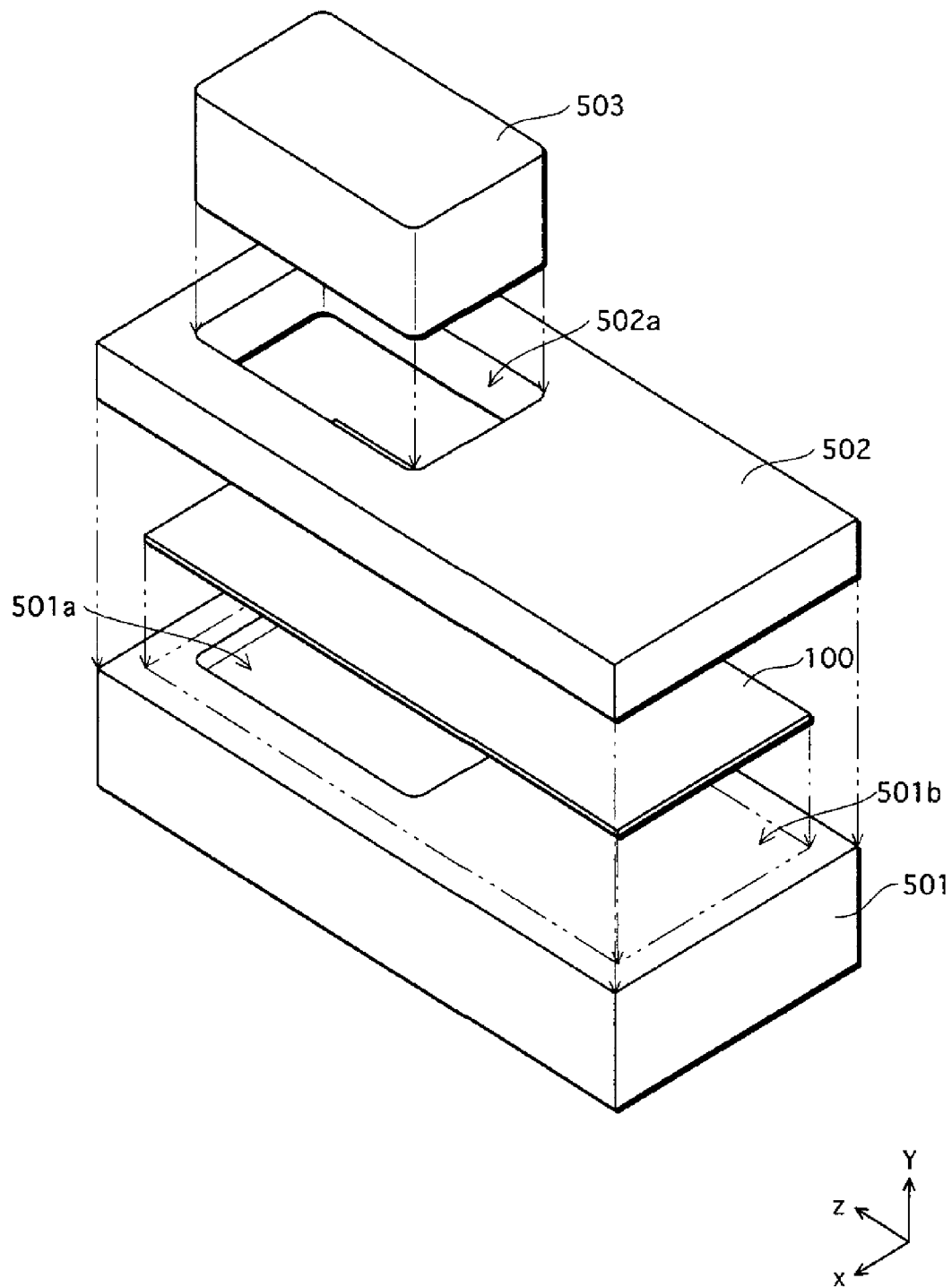
FIG. 4 is a perspective view schematically showing the process of forming the dent in the laminate sheet 100 in the manufacturing process of the laminate cased battery 1.

As shown in FIG. 4, a metal laminate sheet 100, which has been cut into a rectangular shape, is prepared. The metal laminate sheet 100 is then sandwiched by respective main surfaces of a cup processing female mold 501 and a holder mold 502. A dent 501a is formed in a main surface 501b of the cup processing female mold 501 that is on the upper side in the Y axis direction and is offset in the Z axis direction. The shape of the dent 501a corresponds to the shape of the dent to be formed in the metal laminate sheet 100.

The holder mold 502 has an opening 502a at a position that matches the position of the dent 501a of the cup processing female mold 501. The opening 502a is equal in shape to the opening of the dent 501a of the cup processing female mold 501 and is equal to or slightly larger than that in size. It should be noted here that the cup processing female mold 501 and the holder mold 502 are put together such that the main surface 501b, except for the dent 501a, faces a main surface of the holder mold 502 that is on the lower side in the Y axis direction, with the metal laminate sheet 100 therebetween.

Next, the metal laminate sheet 100 sandwiched by the cup processing female mold 501 and the holder mold 502 is pressed using a cup processing male mold 503. The cup processing male mold 503 is slightly smaller, in size in an X-Z plane, than the opening of the dent 501a of the cup processing female mold 501.

In this way, a dent (represented by reference sign 101a in FIG. 5A) is formed in the metal laminate sheet 100.

When the dent 101a is formed in the metal laminate sheet 100, the metal laminate sheet 100 is sandwiched by the cup processing female mold 501 and the holder mold 502 so as not to make wrinkles in the remaining areas of the metal laminate sheet 100. The pressure applied to sandwich the metal laminate sheet 100 is, for example, approximately 10 [kN].

3-2 Housing Electrode Assembly 20

A dented sheet 101 that includes a dent 101a is completed through the above-described procedures.

Figure 5A:
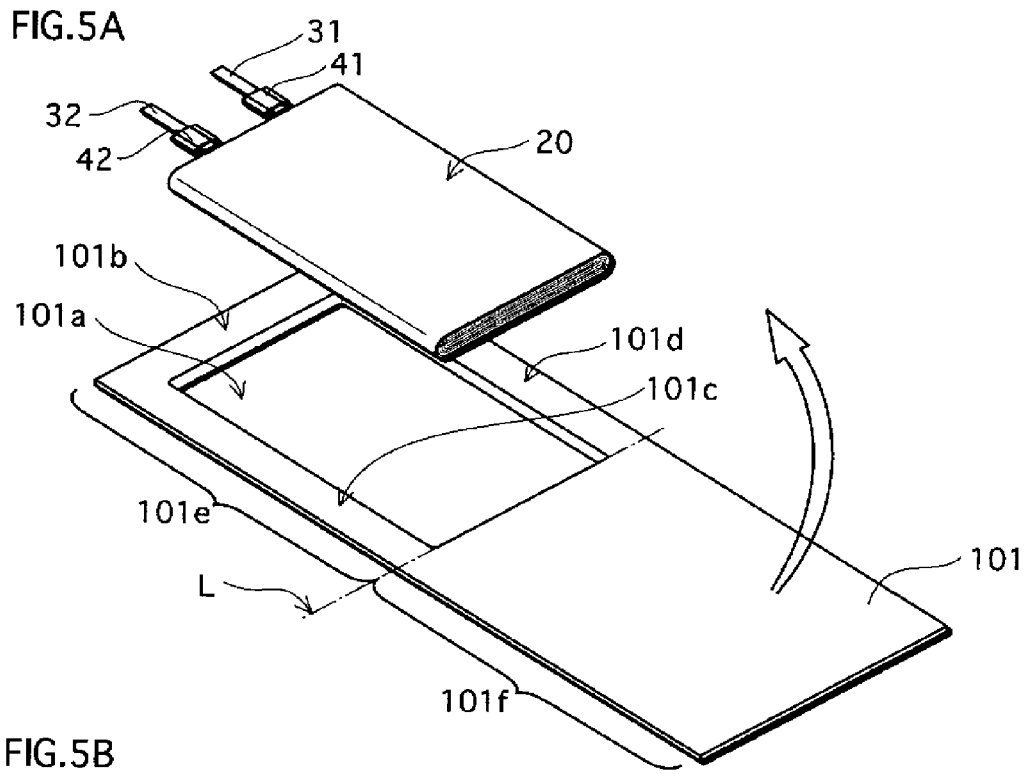
FIG. 5A is a perspective view schematically showing the process of housing the electrode assembly 20 in the dent 101a in the manufacturing process of the laminate cased battery 1.

As shown in FIG. 5A, the dent 101a is formed in an area 101e, which is an upper-left-side half of the dented sheet 101 in the Z axis direction, and an area 101f, which is a lower-right-side half of the dented sheet 101, is not processed. Three out of the four sides defining the opening of the dent 101a extend to end portions 101b-101d. The end portions 101b-101d are flat as is the case with the area 101f.

The electrode assembly 20 is housed in the dent 101a of the dented sheet 101. The tabs 31 and 32 are connected to the electrode assembly 20. The tabs 31 and 32 are extended out toward upper left in the Z axis direction. When the electrode assembly 20 is housed in the dent 101a, part of the tabs 31 and 32 is deposited on the end portion 101b to cross the end portion 101b. Accordingly, to ensure that the tabs 31 and 32 are insulated from each other and the tabs 31 and 32 are insulated from the aluminum layer, which is a constituent element of the dented sheet 101, the tab resins 41 and 42 are attached to the tabs 31 and 32, respectively.

After the electrode assembly 20 is housed in the dent 101a as described above, the dented sheet 101 is bent at one side of the opening of the dent 101a or near the side, namely, using the side or near as a return line L, so that the area 101*f* overlaps with the area 101*e*, closing the opening of the dent 101*a*.

3-3 Sealing at Three Ends

Figure 5B:
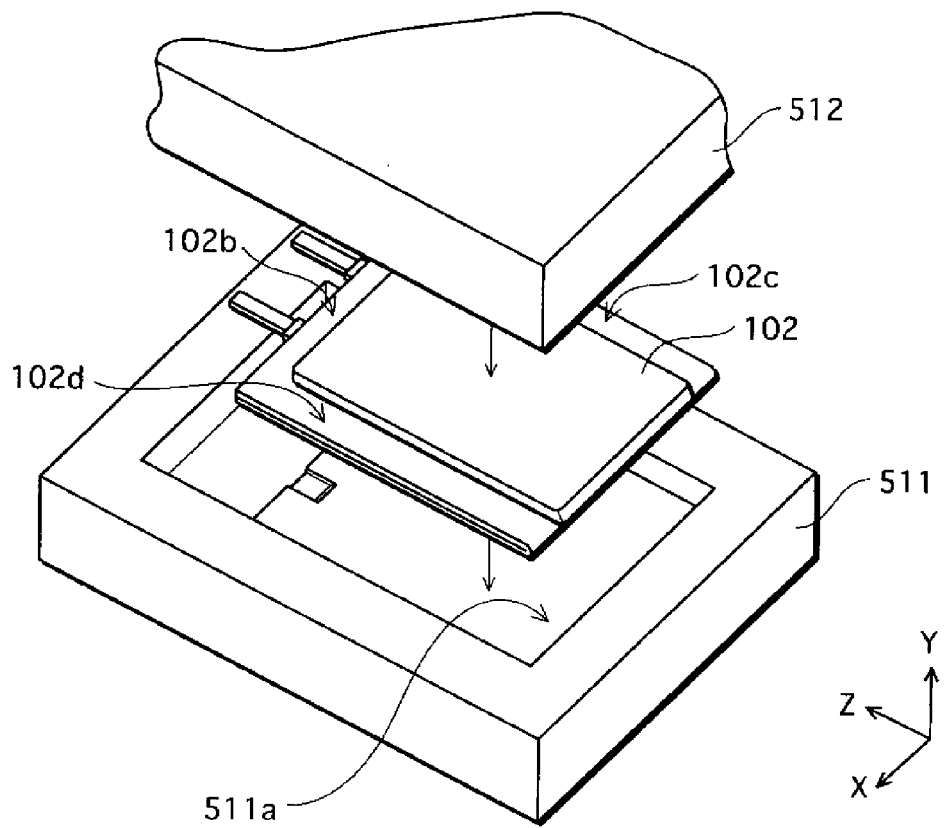
FIG. 5B is a perspective view schematically showing the sealing process in the manufacturing process of the laminate cased battery 1.

As shown in FIG. 5B, a pre-sealing battery 102, in which the area 101*f* overlaps with the area 101*e* after the bending, is housed in a dent 511*a* of a seal female mold 511. Then, a seal male mold 512 having a dent (not illustrated), which is in a shape that corresponds to the shape of the dent 511*a*, is pressed onto the seal female mold 511. A sealing heater (not illustrated), which is embedded in one or both of the seal female mold 511 and the seal male mold 512, then heats three end portions 102*b*-102*d* of a pre-sealing battery 102 to seal the battery at the three end portions.

In this way, the battery 1 in the present embodiment is completed.

4. Advantages of Battery 1

The battery 1 in the present embodiment, which has the above-described structure and is made by the above-described manufacturing method, has the following advantages.

In the outer casing 10 of the battery 1 of the present embodiment, as indicated by Equations 1 and 2, the curvature radiuses $R_B$ and $R_D$ of the corners on the bottom side are set to be larger than the curvature radiuses $R_A$ and $R_C$ of the corners on the top side. With this structure, it is possible to reduce the stresses applied to the corners where the side surface 10*g* and the side surface 10*f* meet each other and the side surface 10*g* and the side surface 10*h* meet each other on the bottom side, and the main surface 10*a* and the side surface 10*g* meet each other, when the dent 101*a* is formed in the metal laminate sheet 100.

Further, in the present embodiment, the curvature radius $R_E$ of the corners where the side surface 10*f* and the main surface 10*a* meet each other and the side surface 10*h* and the main surface 10*a* meet each other, is set as indicated by Equation 3. This is more advantageous in terms of reducing the stresses that are generated when the dent 101*a* is formed.

In the battery 1 of the present embodiment, all the curvature radiuses at the corners where the surfaces, including those on the top side, meet each other are increased uniformly. That is to say, the curvature radiuses $R_B$ and $R_D$ of the corners on the bottom side are set to be larger since this is required in terms of preventing pin holes or cracks from occurring. At the same time, the curvature radiuses $R_A$ and $R_C$ of the corners on the top side are set to be smaller than on the bottom side (are set to be substantially equal to conventional curvature radiuses). With this structure, the reduction of the energy efficiency can be restricted to the minimum, and when the battery 1 is manufactured (for example, when, after the electrode assembly 20 is housed in the dent 101*a*, the sheet is sealed at three side edges thereof) problems, such as breaking the electrode plate 21 or 22 of the electrode assembly 20, can be restricted.

Accordingly, the battery 1 of the present embodiment has a reduced number of pin holes and cracks occurring in the outer casing 10, and achieves high energy density. In particular, when the electrode assembly 20 is made thicker in correspondence with a larger battery capacity, each corner on the bottom side of the electrode assembly 20 is difficult to have pin holes or cracks.

5. Confirmation Experiment

The following will describe an experiment performed to confirm the above-described advantages of the battery, with reference to Table 1.

TABLE 1

| | Corner R (mm) | | | | | Maximum Depth for molding (mm) | Breakage of electrode plate |
|---|---|---|---|---|---|---|---|
| | $R_A$ | $R_B$ | $R_C$ | $R_D$ | $R_E$ | | |
| Invention Sample 1 | 2.0 | 2.0 | 2.0 | 3.0 | 2.0 | 6.1 | — |
| Invention Sample 2 | 2.0 | 3.0 | 2.0 | 2.0 | 2.0 | 5.9 | — |
| Invention Sample 3 | 2.0 | 3.0 | 2.0 | 3.0 | 3.0 | 6.4 | No |
| Invention Sample 4 | 2.0 | 2.0 | 2.0 | 2.3 | 2.0 | 5.8 | — |
| Invention Sample 5 | 2.0 | 2.3 | 2.0 | 3.0 | 2.0 | 5.7 | — |
| Comparative Sample 1 | 2.0 | 2.0 | 2.0 | 2.0 | 2.0 | 5.6 | — |
| Comparative Sample 2 | 3.0 | 3.0 | 3.0 | 3.0 | 3.0 | 6.4 | Yes |

5-1 Invention Example 1

As shown in Table 1, in Invention Sample 1, only the curvature radius $R_D$ at the corner where the main surface 10*a* meets the side surface 10*g* on the bottom side (see FIG. 2B) was set to 3.0 [mm], and the curvature radiuses $R_A$, $R_B$, $R_C$ and $R_E$ at the other corners where surfaces meet each other were set to 2.0 [mm]. That is to say, Invention Sample 1 satisfies the relationship represented by Equation 2.

5-2 Invention Sample 2

In Invention Sample 2, only the curvature radius $R_B$ at the corners on the bottom side where the side surface 10*g* respectively meets the side surface 10*f* and the side surface 10*h* (see FIG. 2A) were set to 3.0 [mm], and the curvature radiuses $R_A$, $R_C$, $R_D$ and $R_E$ at the other corners where surfaces meet each other were set to 2.0 [mm]. That is to say, Invention Sample 2 satisfies the relationship represented by Equation 1.

5-3 Invention Sample 3

In Invention Sample 3, (a) the curvature radius $R_D$ at the corner where the side surface 10*g* on the bottom side and the main surface 10*a* meet each other (see FIG. 2B), (b) the curvature radius $R_B$ at the corners on the bottom side where the side surface 10*g* respectively meets the side surface 10*f* and the side surface 10*h* (see FIG. 2A), and (c) the curvature radius $R_E$ at the corners where the main surface 10*a* respectively meets the side surface 10*f* and the side surface 10*h* (see FIG. 3) were set to 3.0 [mm], and the curvature radiuses $R_A$ and $R_C$ at the other corners where surfaces meet each other were set to 2.0 [mm]. That is to say, Invention Sample 3 satisfies both the relationships represented by Equation 1 and Equation 2.

5-4 Invention Sample 4

In Invention Sample 4, only the curvature radius $R_D$ at the corner where the main surface 10*a* meets the side surface 10*g* on the bottom side (see FIG. 2B) was set to 2.3 [mm], and the curvature radiuses $R_A$, $R_B$, $R_C$ and $R_E$ at the other corners where surfaces meet each other were set to 2.0 [mm]. That is to say, Invention Sample 4 satisfies the relationship represented by Equation 2, as is the case with Example 1.

5-5 Invention Sample 5

In Invention Sample 5, only the curvature radius $R_B$ at the corners on the bottom side where the side surface 10*g* respectively meets the side surface 10*f* and the side surface 10*h* (see FIG. 2A) were set to 2.3 [mm], and the curvature radiuses $R_A$, $R_C$, $R_D$ and $R_E$ at the other corners where surfaces meet each other were set to 2.0 [mm]. That is to say, Invention Sample 5 satisfies the relationship represented by Equation 1, as is the case with Invention Sample 2.

5-6 Comparative Sample 1

In Comparative Sample 1, all the curvature radiuses $R_A$ to $R_E$ at the corners where surfaces meet each other were set to 2.0 [mm].

5-7 Comparative Sample 2

In Comparative Sample 2, all the curvature radiuses $R_A$ to $R_E$ at the corners where surfaces meet each other were set to 3.0 [mm].

5-8 Maximum Depth for Molding Dent

In manufacturing each sample of Invention Samples 1-5 and Comparative Samples 1-2, when the dent 101a was formed using the molds 501 to 503 shown in FIG. 4, a maximum dent depth at which a pin hole occurred was measured. The results are shown in Table 1.

As shown in Table 1, Invention Sample 3 and Comparative Sample 2 had the largest value of the maximum dent depth, 6.4 [mm]. They are followed by Invention Samples 1, 2, 4, 5, and Comparative Sample 1, in the stated order.

The results show that if the curvature radius $R_B$ or $R_D$ on the bottom side or the curvature radius $R_E$ on the side surface side is set to be (specifically, 3.0 [mm] or 2.3 [mm]) larger than the curvature radius of Comparative Sample 1 (specifically, 2.0 [mm]), the maximum dent depth becomes larger as well.

5-9 Electrode Plate Breakage

The samples of Invention Sample 3 and Comparative Sample 2 were disassembled after they were manufactured, and it was checked whether or not the electrode plate 21 or 22 was broken. The results are shown in Table 1.

As shown in Table 1, no breakage of electrode plate was detected in Invention Sample 3, but the electrode plates 21 and 22 of Comparative Sample 2 had been broken.

5-10 Consideration

From the above-described results, it is considered that, in the laminate cased battery, setting the curvature radiuses $R_A$ to $R_E$ to satisfy the positional relationships represented by Equations 1-3 makes it possible to increase the maximum dent depth for molding the dent 101a, while preventing pin holes or the like from occurring, and to restrict the breakage of the electrode plates 21 and 22 when the sheet is sealed at three side edges thereof, for example.

6. Others

The above-described embodiment and the experiment show one example of the present invention. Accordingly, the present invention is not limited to these, except for the characteristics of the present invention. For example, in the above-described embodiment, the curvature radiuses $R_A$ to $R_E$ are set to satisfy all Equations 1-3. However, as understood from the results of the confirmation experiment, the advantageous effects can be obtained if the curvature radiuses $R_A$ to $R_E$ are set to satisfy at least the positional relationships represented by Equations 1-3.

Also, in the above description, the curvature radiuses at the corners are set to be in a range of 2.0 [mm] to 3.0 [mm]. The present invention is not limited to this in so far as the curvature radiuses at the corners satisfy any of Equations 1 to 3 disclosed above, though it is preferable that the curvature radiuses $R_A$ to $R_E$ are set to satisfy the following relationships, in terms of obtaining actually the above-stated advantages.

$$R_B - R_A \geq 0.5 \text{[mm]} \quad \text{[Equation 4]}$$

$$R_D - R_C \geq 0.5 \text{[mm]} \quad \text{[Equation 5]}$$

$$R_E - R_C \geq 0.5 \text{[mm]} \quad \text{[Equation 6]}$$

Further, it is preferable to satisfy the following relationships in terms of obtaining the advantages more securely.

$$R_B - R_A \geq 1.0 \text{[mm]} \quad \text{[Equation 7]}$$

$$R_D - R_C \geq 1.0 \text{[mm]} \quad \text{[Equation 8]}$$

$$R_E - R_C \geq 1.0 \text{[mm]} \quad \text{[Equation 9]}$$

Also, when the electrode assembly 20 is 7 mm thick as in the above-described embodiment, it is preferable that the curvature radiuses $R_A$ to $R_E$ at the corners are set to be in a range of 0.5 [mm] to 4.0 [mm], in terms of actually manufacturing a laminate cased battery even if the above-disclosed Equations 4 to 9 are adopted. It should be noted here that the values of the curvature radiuses $R_A$ to $R_E$ at the corners are determined relative to the depth of the dent.

Also, in the above-described embodiment, each corner where the surfaces meet is rounded to have one curvature radius. However, not limited to this, each corner may be rounded to have two or more curvature radiuses. Also, each corner may be formed by the multistage taper machining. In these cases, the curvature radiuses at each corner need to satisfy the above-disclosed Equations 1 to 9.

Also, in the laminate cased battery 1 of the above-described embodiment, the tabs 31 and 32 are extended out from the top side of the outer casing 10. However, not limited to this, the tabs 31 and 32 may be extended out from the outer casing 10 to cross the side edge 10d or 10c. In this case, as is the case with the present embodiment, the bottom side and the top side are defined based on the return line L shown in FIG. 5A, and the relationships between the curvature radiuses $R_A$ to $R_E$ at the corners where the surfaces meet are satisfied in accordance with the definition of the bottom side and the top side.

Furthermore, in the laminate cased battery 1 of the above-described embodiment, an electrode assembly formed by winding electrode plates is adopted as the electrode assembly 20. Not limited to this winding type, a stack type electrode assembly or a bending type electrode assembly may be adopted.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A laminate cased battery comprising:
   an electrode assembly including a positive plate and a negative plate; and
   an outer casing made from a sheet of metal laminate and having a substantially rectangular parallelepiped inner space in which the electrode assembly is housed the space being surrounded by a first main surface, a second main surface, a first side surface, a second side surface, a third side surface, and a fourth side surface, and the first main surface closing an opening of a dent defined by the second main surface, the first side surface, the second side surface, the third side surface, and the fourth side surface, wherein
   the first main surface and the first side surface seamlessly continue to each other constituting a surface, sharing an edge as a return line at which the surface is folded to close the opening,
   the second main surface and the first main surface face each other with the electrode assembly therebetween, the second main surface seamlessly continuing to each of the first side surface, the second side surface, the third side surface, and the fourth side surface via a corresponding corner having a curvature radius, the first side surface and the second side surface face each other with the electrode assembly therebetween, the second side surface is approximately equal to the first side surface in size, the third side surface and the fourth side surface face each other with the electrode assembly therebetween, the third side surface seamlessly continuing to each of the first side surface and the second side surface via a corresponding corner having a curvature radius, the fourth side surface is approximately equal to the third side surface in size, the fourth side surface seamlessly continuing to each of the first side surface and the second side surface via a corresponding corner having a curvature radius, the first main surface and the first side surface seamlessly continue to each other, the first side surface and the second main surface seamlessly continue to each other, the second main surface and the second side surface seamlessly continue to each other, the second main surface and the third side surface seamlessly continue to each other, and the second main surface and the fourth side surface seamlessly continue to each other, and a corner between the first side surface and the second main surface is larger in curvature radius than a corner between the second side surface and the second main surface, and wherein a corner between the first side surface and the third side surface and a corner between the first side surface and the fourth side surface are larger in curvature radius than a corner between the second side surface and the third side surface and a corner between the second side surface and the fourth side surface.

2. A laminate cased battery comprising:

an electrode assembly including a positive plate and a negative plate; and an outer casing made from a sheet of metal laminate and having a substantially rectangular parallelepiped inner space in which the electrode assembly is housed the space being surrounded by a first main surface, a second main surface, a first side surface, a second side surface, a third side surface, and a fourth side surface, and the first main surface closing an opening of a dent defined by the second main surface, the first side surface, the second side surface, the third side surface, and the fourth side surface, wherein the first main surface and the first side surface seamlessly continue to each other constituting a surface, sharing an edge as a return line at which the surface is folded to close the opening, the second main surface and the first main surface face each other with the electrode assembly therebetween, the second main surface seamlessly continuing to each of the first side surface, the second side surface, the third side surface, and the fourth side surface via a corresponding corner having a curvature radius, the first side surface and the second side surface face each other with the electrode assembly therebetween, the second side surface is approximately equal to the first side surface in size, the third side surface and the fourth side surface face each other with the electrode assembly therebetween, the third side surface seamlessly continuing to each of the first side surface and the second side surface via a corresponding corner having a curvature radius, the fourth side surface is approximately equal to the third side surface in size, the fourth side surface seamlessly continuing to each of the first side surface and the second side surface via a corresponding corner having a curvature radius, the first main surface and the first side surface seamlessly continue to each other, the first side surface and the second main surface seamlessly continue to each other, the second main surface and the second side surface seamlessly continue to each other, the second main surface and the third side surface seamlessly continue to each other, and the second main surface and the fourth side surface seamlessly continue to each other, and a corner between the first side surface and the second main surface is larger in curvature radius than a corner between the second side surface and the second main surface, and wherein a corner between the second main surface and the third side surface and a corner between the second main surface and the fourth side surface are larger in curvature radius than a corner between the second side surface and the second main side surface.

3. The laminate cased battery of claim 1, wherein at least one corner among a corner between the first side surface and the second main surface, a corner between the first side surface and the third side surface, and a corner between the first side surface and the fourth side surface is larger in curvature radius by at least 0.3 mm than at least one corner among a corner between the second side surface and the second main surface, a corner between the second side surface and the third side surface, and a corner between the second side surface and the fourth side surface.

4. The laminate cased battery of claim 1, wherein at least one corner among a corner between the first side surface and the second main surface, a corner between the first side surface and the third side surface, and a corner between the first side surface and the fourth side surface is larger in curvature radius by at least 1.0 mm than at least one corner among a corner between the second side surface and the second main surface, a corner between the second side surface and the third side surface, and a corner between the second side surface and the fourth side surface.

5. A laminate cased battery comprising:

an electrode assembly including a positive plate and a negative plate; and an outer casing made from a sheet of metal laminate and having a substantially rectangular parallelepiped inner space in which the electrode assembly is housed the space being surrounded by a first main surface, a second main surface, a first side surface, a second side surface, a third side surface, and a fourth side surface, and the first main surface closing an opening of a dent defined by the second main surface, the first side surface, the second side surface, the third side surface, and the fourth side surface, wherein the first main surface and the first side surface seamlessly continue to each other constituting a surface, sharing an edge as a return line at which the surface is folded to close the opening, the second main surface and the first main surface face each other with the electrode assembly therebetween, the second main surface seamlessly continuing to each of the first side surface, the second side surface, the third side surface, and the fourth side surface via a corresponding corner having a curvature radius, the first side surface and the second side surface face each other with the electrode assembly therebetween, the second side surface is approximately equal to the first side surface in size, the third side surface and the fourth side surface face each other with the electrode assembly therebetween, the third side surface seamlessly continuing to each of the first side surface and the second side surface via a corresponding corner having a curvature radius, the fourth side surface is approximately equal to the third side surface in size, the fourth side surface seamlessly continuing to each of the first side surface and the second side surface via a corresponding corner having a curvature radius, the first main surface and the first side surface seamlessly continue to each other, the first side surface and the second main surface seamlessly continue to each other, the second main surface and the second side surface seamlessly continue to each other, the second main surface and the third side surface seamlessly continue to each other, and the second main surface and the fourth side surface seamlessly continue to each other, and a corner between the first side surface and the second main surface is larger in curvature radius than a corner between the second side surface and the second main surface, and wherein leads that are respectively connected to the positive plate and the negative plate extend out from one side of the electrode assembly, and the leads pass through an area where the second side surface and the first main surface meet each other to extend out of the outer casing.

6. The laminate cased battery of claim 2, wherein at least one corner among a corner between the first side surface and the second main surface, a corner between the first side surface and the third side surface, and a corner between the first side surface and the fourth side surface is larger in curvature radius by at least 0.3 mm than at least one corner among a corner between the second side surface and the second main surface, a corner between the second side surface and the third side surface, and a corner between the second side surface and the fourth side surface.

7. The laminate cased battery of claim 2, wherein at least one corner among a corner between the first side surface and the second main surface, a corner between the first side surface and the third side surface, and a corner between the first side surface and the fourth side surface is larger in curvature radius by at least 1.0 mm than at least one corner among a corner between the second side surface and the second main surface, a corner between the second side surface and the third side surface, and a corner between the second side surface and the fourth side surface.

8. The laminate cased battery of claim 5, wherein at least one corner among a corner between the first side surface and the second main surface, a corner between the first side surface and the third side surface, and a corner between the first side surface and the fourth side surface is larger in curvature radius by at least 0.3 mm than at least one corner among a corner between the second side surface and the second main surface, a corner between the second side surface and the third side surface, and a corner between the second side surface and the fourth side surface.

9. The laminate cased battery of claim 5, wherein at least one corner among a corner between the first side surface and the second main surface, a corner between the first side surface and the third side surface, and a corner between the first side surface and the fourth side surface is larger in curvature radius by at least 1.0 mm than at least one corner among a corner between the second side surface and the second main surface, a corner between the second side surface and the third side surface, and a corner between the second side surface and the fourth side surface.

\* \* \* \* \*